(12) United States Patent
Kashiwagi et al.

(10) Patent No.: US 6,508,589 B2
(45) Date of Patent: Jan. 21, 2003

(54) LINEAR GUIDE RAIL AND METHOD FOR WORKING SAME

(75) Inventors: Shizuo Kashiwagi, Bloomingdale, IL (US); Tomohiro Imanishi, Saitama (JP); Yutaka Tsuchida, Saitama (JP); Hiroaki Fujishiro, Saitama (JP); Kunio Kawashima, Gunma (JP)

(73) Assignee: NSK Ltd., Tokyo (JP)

( * ) Notice: Subject to any disclaimer, the term of this patent is extended or adjusted under 35 U.S.C. 154(b) by 48 days.

(21) Appl. No.: 09/731,701

(22) Filed: Dec. 8, 2000

(65) Prior Publication Data

US 2001/0012417 A1 Aug. 9, 2001

(30) Foreign Application Priority Data

Dec. 8, 1999 (JP) .............................. 11-349291
Aug. 11, 2000 (JP) ....................... 2000-243732

(51) Int. Cl.⁷ .............................................. F16C 29/04
(52) U.S. Cl. ....................................................... 384/49
(58) Field of Search .............................. 384/45, 44, 43, 384/49, 7

(56) References Cited

U.S. PATENT DOCUMENTS 5,318,365 A * 6/1994 Ichida ......................... 384/45

FOREIGN PATENT DOCUMENTS

JP          9-133195        5/1997  ........... F16H/25/22

* cited by examiner

Primary Examiner—Lenard A. Footland
(74) Attorney, Agent, or Firm—Sughrue Mion, PLLC

(57) ABSTRACT

When working a linear guide rail having one or more raceway grooves 2 on the side surfaces thereof, using rotary dies each including on the circumferential portion thereof a projection-shaped working portion matched in shape to the raceway groove 2, the raceway grooves 2 are rolled onto a rail blank work W. Since the raceway grooves 2 can be rolled with high accuracy by a single working step, the working time of the raceway grooves as well as the working cost thereof can be reduced.

3 Claims, 14 Drawing Sheets

TWO-GROOVE TYPE

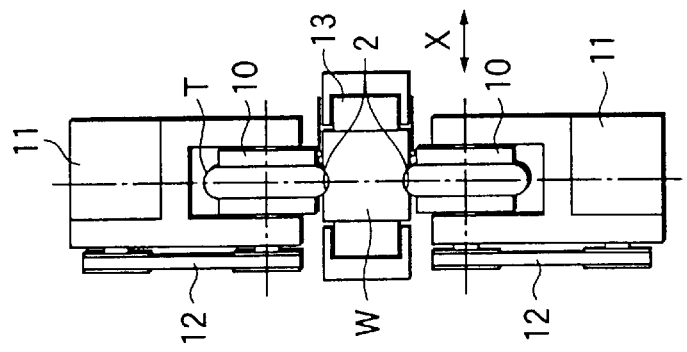
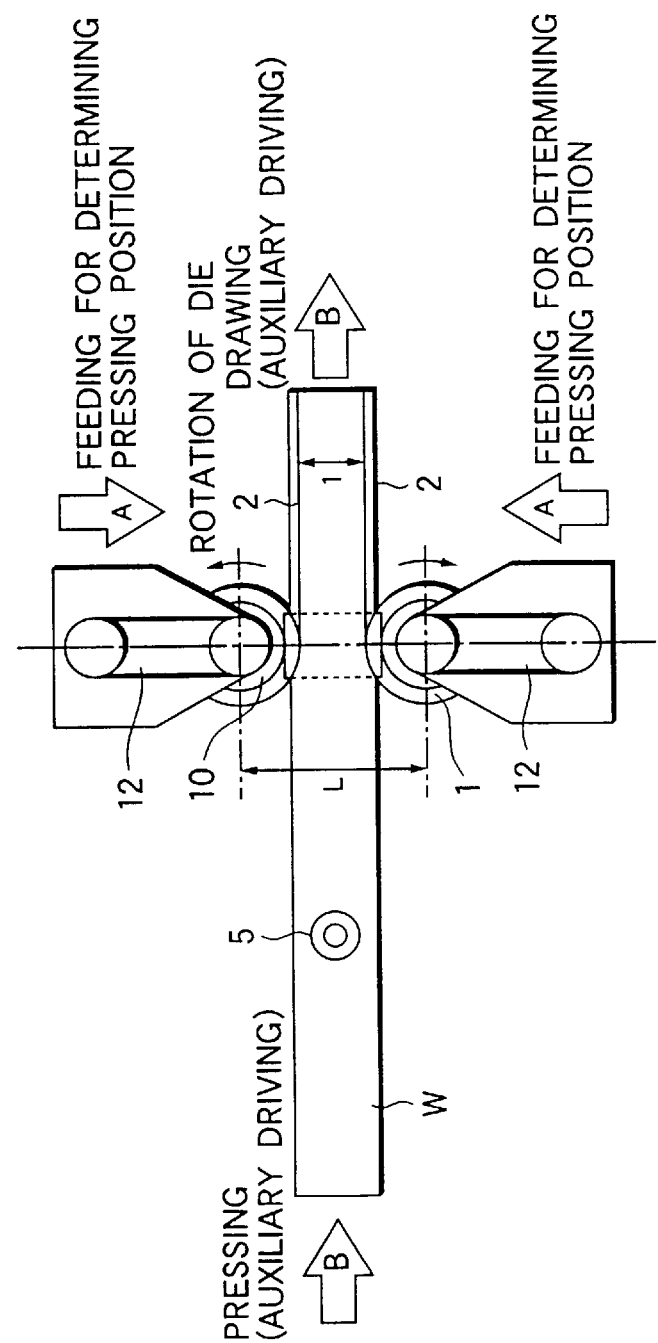

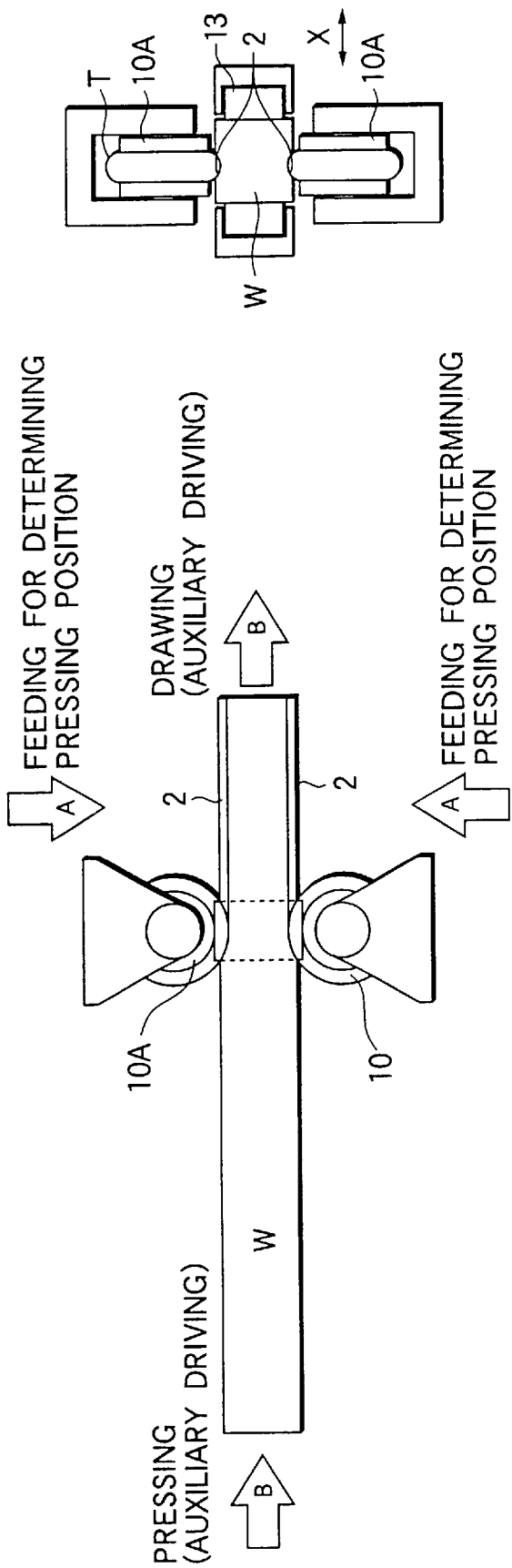

MULTI-STAGE WORKING

ONE-GROOVE TYPE

TWO-GROOVE TYPE

ROUND SHAFT WORKING

THREE-SURFACE WORKING

ONE-SURFACE WORKING

RELATION BETWEEN SURFACE ROUGHNESS AND
SLIDING RESISTANCE VARIATION RATIO

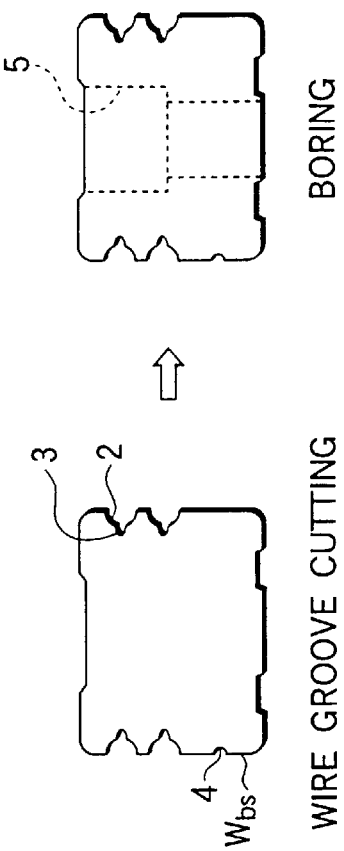
FIG.15A DRAWING
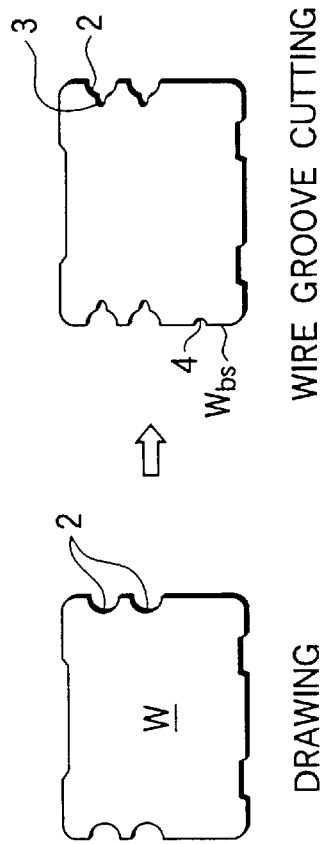
FIG.15B WIRE GROOVE CUTTING
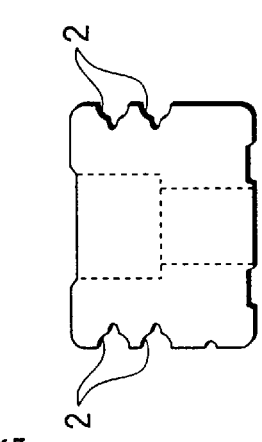
FIG.15C BORING
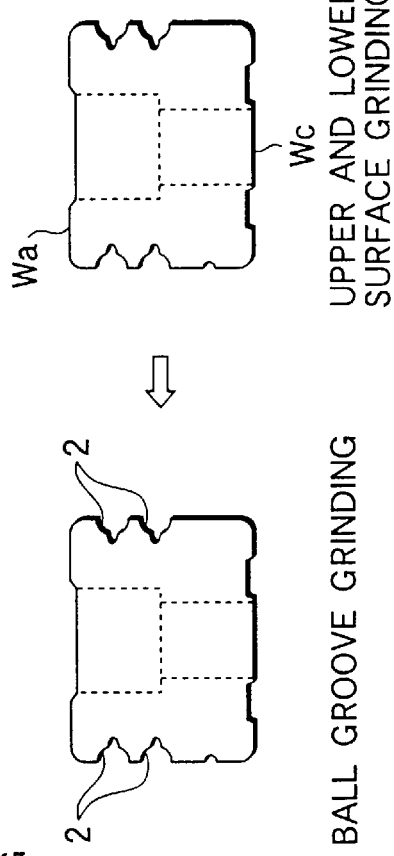
FIG.15D UPPER AND LOWER SURFACE GRINDING
FIG.15E BALL GROOVE GRINDING
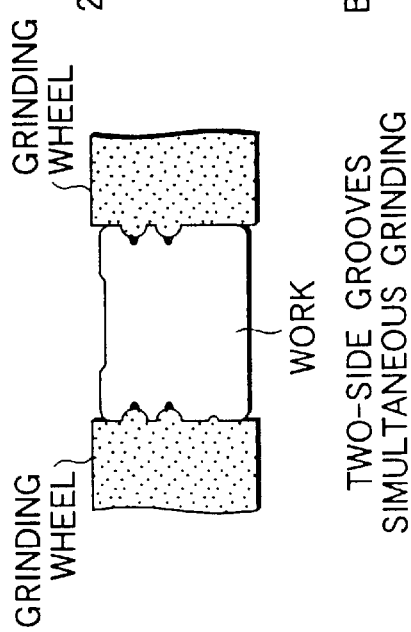
FIG.15F TWO-SIDE GROOVES SIMULTANEOUS GRINDING

LINEAR GUIDE RAIL AND METHOD FOR WORKING SAME

BACKGROUND OF THE INVENTION

1. Field of the Invention

The present invention relates to a linear guide rail and a method for working the same and, in particular, to an improvement in working of one or more raceway grooves of such linear guide rail.

2. Description of the Related Art

Conventionally, a manufacture of a linear guide rail is carried out through, for example, a step shown in FIGS. 15A to 15F. That is, steel material (work) used as a linear guide rail blank work is drawn to thereby form the outer shape of the linear guide rail as well as the shape of each of raceway grooves 2 (see FIG. 15A).

Next, the groove bottom portion of the raceway groove 2 of the thus drawn-worked linear guide rail work is cut to thereby form a wire holder groove 3(or, in some cases, an oil storage groove) for insertion of a wire holder and/or a base surface display line (or a base surface display groove) 4 for displaying a mounting base surface Wbs (see FIG. 15B).

The above operations are executed as pre-working operations.

After then, the linear guide rail work is heat treated.

Next, the linear guide rail is bored to thereby make a mounting bolt hole 5 (see FIG. 15C).

Then, the upper surface Wa and lower surface Wc of the guide rail work are finish ground (see FIG. 15D).

Further, the raceway grooves 2 as well as the two side surfaces Wbs and Wb of the guide rail work are finish ground (see FIG. 15E). The groove grinding operation, as shown in FIG. 15F, is carried out by the simultaneous grinding operation of the two side surfaces of the guide rail work.

However, the above-mentioned pre-working operations, that is, the drawing and cutting operations provides working accuracy and surface roughness which are not sufficient as finish accuracy and, therefore, as a finishing step, there is necessary a grinding operation even in the case of a product which does not require high accuracy, which raises a problem that it takes long time to work the guide rail and thus the working cost of the guide rail becomes expensive.

That is, in the above drawing operation, there can be provided only the insufficient working accuracy and thus, in the grinding operation, it is necessary to provide rather large grinding allowance, which results in the longer grinding time.

On the other hand, in order to work a guide rail as accurately as possible in the drawing operation, the number of times of drawing must be increased. In fact, however, each time the guide rail work is drawn, it is necessary to execute the following pre- and post-treatments: that is, (1) leader formation (a treatment to narrow the leading portion of the guide rail work so as to be insertable into a die); (2) annealing; (3) shot peening for removing scales developed in a heat treatment; and, (4) a phosphate film treatment. This raises a problem that the working cost of the guide rail is expensive and the working accuracy thereof is not so good.

SUMMARY OF THE INVENTION

The present invention aims at eliminating the drawbacks found in the above-mentioned conventional linear guide rail and the conventional method for working the same. Accordingly, it is an object of the invention to provide a linear guide rail and a method for working the same which, by applying a rolling technique to a linear groove to be formed in the linear guide rail, can reduce the working time and cost of the linear guide rail as well as can secure the necessary working accuracy of the guide rail.

In attaining the above object, according to a first aspect of the invention, there is provided a linear guide rail including one or more raceway grooves along which rolling bodies roll, wherein the raceway grooves are respectively rolled.

According to a second aspect of the invention, in a linear guide rail according to the first aspect of the invention, the surface roughness of each of the raceway grooves in the longitudinal direction thereof is in the range of 0.05–0.2 Ra.

According to a third aspect of the invention, in a linear guide rail according to the first aspect of the invention, the lower surface of the linear guide rail is formed in such a dented shape that the width-direction two end portions thereof are slightly raised over the width-direction central portion thereof.

According to a fourth aspect of the invention, in a linear guide rail according to the first aspect of the invention, a decarburized layer of the surface of a rail blank work is removed before the rail blank work is rolled.

And, according to a fifth aspect of the invention, there is provided a method for working a linear guide rail having one or more raceway grooves along which rolling bodies can roll, wherein, using two or more rotary dies each including a projection-shaped working portion matched in shape to the raceway groove, the raceway grooves are rolled on a rail blank work.

According to a sixth aspect of the invention, in a method according to the fifth aspect to the invention, wherein at the same time when the raceway grooves are rolled on a rail blank work, the lower surface of the rail blank work is ground or cut, using two or more rotary dies each including a projection-shaped working portion matched in shape to the raceway groove.

According to a seventh aspect of the invention, in a method according to the fifth aspect of the invention, as the need arises, at least one of chamfering of the corner portions of the linear guide rail, formation of an oil storage groove in the bottom portion of each of the raceway grooves, and formation of a base surface display line is carried out using the rotary dies simultaneously when the raceway grooves of the linear guide rail are rolled using the same rotary dies.

According to an eighth aspect of the invention, in a method according to the fifth aspect of the invention, by rolling the raceway grooves using rotary dies, the width-direction two end portions of a mounting surface of the linear guide rail are projected slightly up from the width-direction central portion thereof.

According to a ninth aspect of the invention, in a method according to the fifth aspect of the invention, there is further included a sensor for measuring a distance between the working positions of the rotary dies or a distance between the positions of the portions adjacent to the working positions, and, while controlling a distance between the rotary dies so as to be constant, a distance between the raceway grooves can be maintained stably.

According to a tenth aspect of the invention, in a method according to the fifth aspect of the invention, there is further included a sensor for measuring the positions of the raceway grooves just after the raceway grooves are rolled by the rotary dies, and, the positions of the raceway grooves are detected by the sensor and, in accordance with the thus detected values, the positions of the rotary dies are controlled to thereby maintain the inter-raceway groove distance (the distance between the raceway grooves) stably.

According to an eleventh aspect of the invention, in a method according to the fifth aspect of the invention, there are included two rotary dies disposed spaced from each other on the side of two raceway grooves to be formed on one side of the linear guide rail and a rotary die disposed on the other side of the linear guide rail so as to be asymmetric with respect to the above two rotary dies, whereby the linear guide rail is bent formed using the above rotary dies simultaneously when the raceway grooves are rolled using the same rotary dies, thereby being able to produce a linear guide rail having a curvature.

According to a twelfth aspect of the invention, in a method according to the fifth aspect of the invention, the raceway grooves of the linear guide rail are previously rolled using the rotary dies and are then heat treated and, after then, the raceway grooves are ground to thereby finish the same with high accuracy.

As has been described hereinbefore, according to the invention, the raceway grooves of a linear guide rail are rolled in a single step by using rotary dies each having a projection-shaped working portion matched in shape to the raceway groove and, therefore, there is required a smaller working force than a force which is required in the above-mentioned conventional drawing operation. Also, the rotary dies wear less and thus the lives of the dies can be extended. The tissues of the rolling surface are continuous and are thus high in strength. Further, in the case of a product (a linear guide rail) which does not require high accuracy, the raceway grooves of such product can be worked with proper accuracy without cutting or grinding the raceway grooves after the linear guide rail blank work is drawn as in the conventional working method, which can shorten the working time as well as the working cost of the product (linear guide rail). Use of the rotary dies makes it easy to guide lubricant onto the working surface of the rail blank work.

Also, in case where chamfering of the corner portions of the present linear guide rail, formation of an oil storage groove in the bottom portion of each raceway groove, and formation of a base surface display line are carried out simultaneously using the same rotary dies, the working efficiency can be enhanced greatly.

By rolling the raceway grooves using the rotary dies, the width-direction two end portions of the mounting surface of the linear guide rail can be projected slightly up from the width-direction central portion thereof, which makes it possible to stabilize the mounting state of the linear guide rail more. That is, when a mounting bolt is tightened, the mounting contact surface of the rail spreads in the width direction thereof and, therefore, even when a lateral load is applied to the linear guide rail, the linear guide rail can stand firm, thereby being able to enhance the mounting strength of the linear guide rail.

Also, in case where the distance between the working positions of the rotary dies is measured and the measured value is fed back to thereby automatically control the inter-die distance so as to be constant, the distance between the raceway grooves of the product can be maintained more stably, which makes it possible to provide a linear guide rail of high quality.

And, in case where the rotary dies on the two sides of the linear guide rail are arranged asymmetric with respect to each other, the linear guide rail can be bent worked by these rotary dies simultaneously when the raceway grooves are rolled using the same rotary dies, thereby being able to provide a linear guide rail having a curvature.

Further, according to the invention, the raceway grooves of a linear guide rail are formed with high accuracy by cold rolling them and, therefore, even in case where, as the need arises, the raceway grooves are heat treated after such cold rolling and, after then, they are further ground in order to obtain higher accuracy, the grinding allowance of the raceway grooves can be minimized. Accordingly, when compared with the conventional working method, the grinding time of the raceway grooves can be shortened to thereby reduce the working cost of the linear guide rail as well as the degree of bending to be developed by the groove grinding operation can be reduced, so that the raceway grooves can be finished with high efficiency as well as with high accuracy.

BRIEF DESCRIPTION OF THE DRAWINGS

FIGS. 1A and 1B show schematically the main portions of a rail raceway groove rolling apparatus according to a first embodiment of the invention; in particular, FIG. 1A is a side view of the rolling apparatus, and FIG. 1B is a front view thereof;

FIGS. 3A and 3B show schematically the main portions of a rail raceway groove rolling apparatus according to a second embodiment of the invention; in particular, FIG. 3A is a side view of the rolling apparatus, and FIG. 3B is a front view thereof;

FIG. 6A shows a linear guide rail having a mounting surface of a one-raceway groove type, FIG. 6B shows a linear guide rail having a mounting surface of a two-raceway groove type, FIG. 6C shows stresses when the present linear guide rail is installed, and FIG. 6D shows stresses produced when a linear guide rail having a conventional flat mounting surface is installed;

FIG. 13A shows a case in which one surface is worked, and FIG. 13B shows a case in which three surfaces are worked;

DETAILED DESCRIPTION OF THE PREFERRED EMBODIMENTS

Figure 2A:
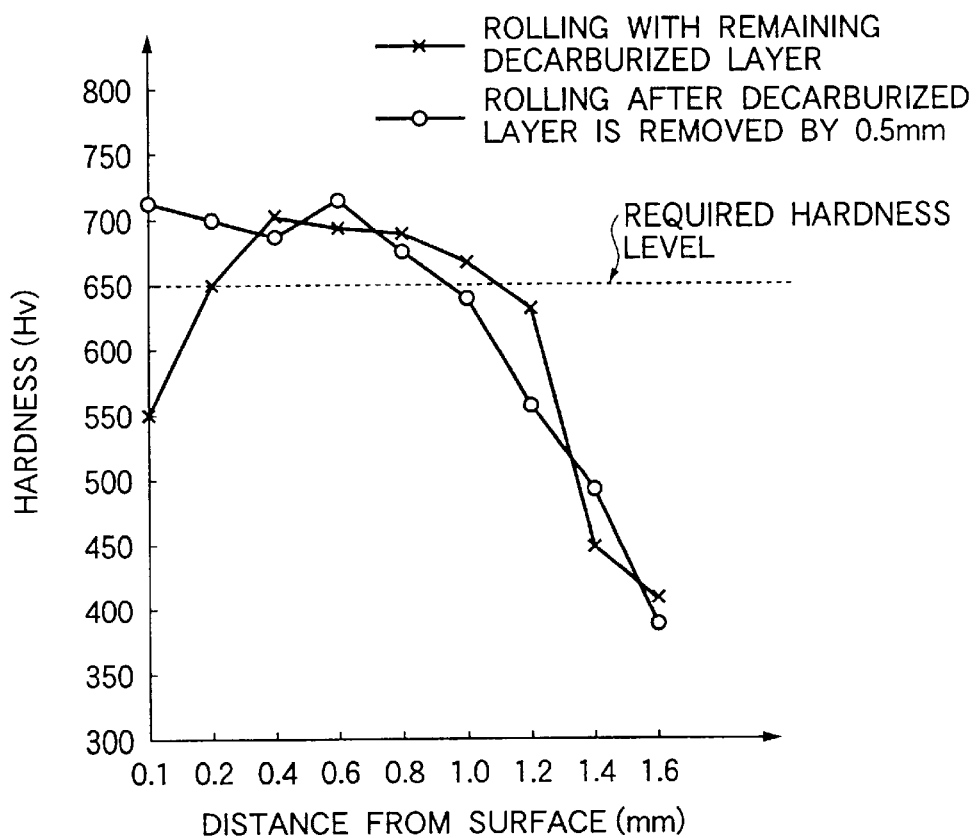
FIG. 2A is a graphical representation of the compared results of hardness between a rail blank work rolled with remaining a decarburized layer thereon and a rail blank work rolled after a decarburized layer is removed therefrom by 0.5 mm.

Now, a description will be given below of the preferred embodiments of a linear guide rail and a method for working the same according to the invention with reference to the accompanying drawings.

FIGS. 1A and 1B show schematically the main portions of a rolling apparatus for rolling one or more raceway grooves onto a linear guide rail according to a first embodiment of the invention: specifically, FIG. 1A is a side view of the main portions of the rolling apparatus; and, FIG. 1B is a front view thereof. Two rotary dies 10 for rolling are disposed opposed to each other in such a manner that a rail blank work W used as the blank material of a linear guide rail is interposed between the two rotary dies 10. Each of the rotary dies 10 is a disk-shaped round die in which the direction of its rotary shaft is arranged at right angles with respect to the direction of the axis of the rail blank work W. The outer peripheral surface (groove working surface) of the die 10 is formed so as to have a convex shape which is matched to the groove shape of each of raceway grooves 2 of a linear guide rail to be rolled, for example, a semi-circular (single R-shaped) convex shape or a Gothic-arc convex shape, thereby forming a projection-shaped working portion T.

To each rotary die 10, there is additionally connected a drive device, that is, a motor 11 for rotating the die 10, and thus the die 10 can be driven or rotated by the motor 11 through a belt 12 (that is, the die 10 is a die of an active type). Also, the rolling apparatus includes a moving and pressing mechanism (not shown) which moves the die 10 together with the drive device 11 toward the rail blank work W in such a manner as shown by an arrow mark A in FIG. 1A to thereby press the die 10 against the rail blank work W.

The rotary die 10, which is fed to a pressing position by the moving and pressing mechanism, can be butted against a stopper (not shown) to be thereby positioned there, or can be positioned using a known positioning and feeding mechanism of an oil pressure NC type or of a BS drive type which is incorporated in the rolling apparatus.

Further, the rolling apparatus includes a positioning and supporting device 13 of an oil pressure type or a fixed type which, in order to stabilize the position of the rail blank work W in the direction thereof shown by an arrow mark X in FIG. 1B (that is, a direction shifted by a 90° phase with respect to the mutually opposing direction of the two dies) in the groove working operation, holds the rail blank work W from both sides thereof to thereby press and support the same.

Firstly, a description will be given below of a working step of working only the raceway grooves 10 of the linear guide rail, which is executed by the illustrated rolling apparatus.

The rail blank work W is previously annealed so as to have pre-working hardness HRC 20 or lower.

Figure 2B:
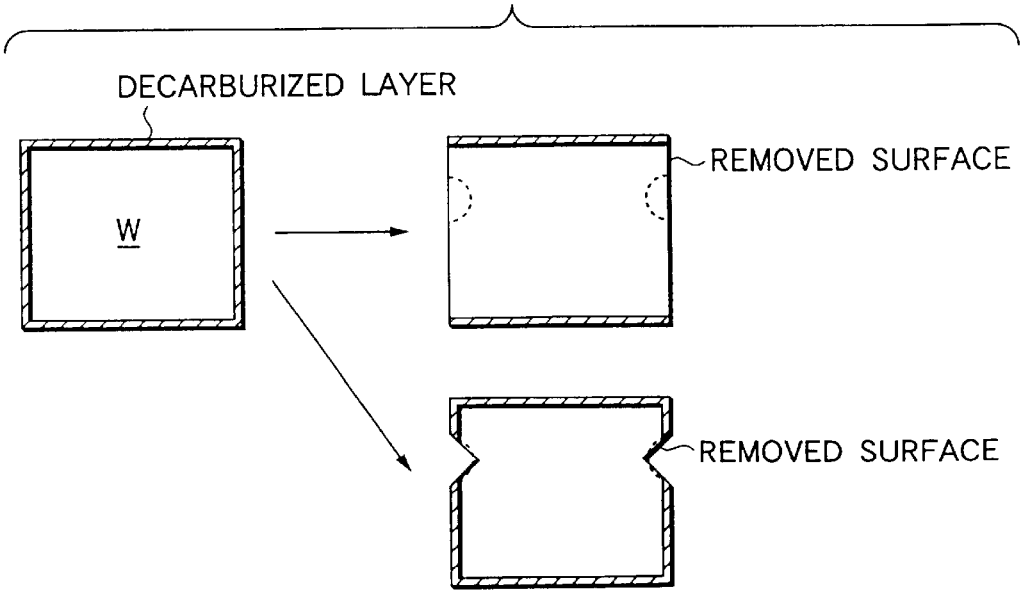
FIG. 2B is a view to show a method for removing the decarburized layer.

Also, there exists a thin decarburized layer on the surface of the rail blank work W and, therefore, in case where the rail blank work W is rolled as it is, there cannot be obtained sufficient surface quenched hardness after the rail blank work W is heat treated. In view of this, before the rail blank work W is rolled, the decarburized layer of the rail blank work W is previously scraped off by an amount of the order of 0.5 mm. Here, FIG. 2A is a graphical representation of the compared results of the quenched hardness after heat treatment between a rail blank work W which is rolled with remaining the decarburized layer thereon and a rail blank work W rolled with the decarburized layer removed by 0.5 mm therefrom; and, the horizontal axis of FIG. 2A expresses distances from the surface of the rail blank work W whose hardness is to be measured, while the vertical axis thereof expresses quenched hardness at the positions of the respective distances. As can be seen clearly from FIG. 2A, in the case of the rail blank work W which is rolled after its decarburized layer is removed by 0.5 mm, the hardness of the surface of the rail blank work W as well as the hardness of the portion of the rail blank work W adjacent to such surface respectively show high values compared with the rail blank work W which is rolled with the decarburized layer existing thereon. Referring here to a method for removing the decarburized layer, the decarburized layer existing in the rail blank work W in such. a manner as shown on the left side of FIG. 2B may be removed into the form of such planes as shown in an upper view on the right side of FIG. 2B, or may be removed into the form of such V-like shapes as shown in a lower view on the right side of FIG. 2B. In case where the decarburized layer of the rail blank work W is removed into the form of V shapes, there is obtained an advantage that a rolling force necessary after removal of the decarburized layer can be reduced. By the way, two semicircles, which are respectively shown right and left by broken lines in the right upper view of FIG. 2B, express raceway grooves to be rolled.

And, the pair of mutually opposing rotary dies 10 are fed to their pressing positions by the moving and pressing mechanism (not shown) and are positioned there, for example, by making them butt against their respective stoppers. In this manner, a distance L between the two rotary dies 10 is previously set so as to correspond to a known dimension 1 between the two raceway grooves 2, 2 respectively formed on the two sides of the rail blank work W.

After then, in a state where the two rotary dies 10 are rotating, the rail blank work W is inserted between the two rotary dies 10, and is held at its working position accurately by the positioning and supporting device 13; in this supporting state, the rail blank work W is fed in a direction shown by an arrow mark B in FIG. 1A and is passed through between the two rotary dies 10, so that the raceway grooves 2 of the linear guide rail are rolling molded on the side surfaces of the rail blank work W. To finish the rail blank work w into its final shape, there are available two method: that is, in one method, the rail blank work W may be finished by passing the rail blank work W through the two rotary dies 10 once; and, in the other method, the rail blank work W may be finished by passing the rail blank work W through the two rotary dies 10 two or more times while changing the distances between the two rotary dies 10. And, the number of times of passing of the rail blank work W depends on the kinds of the material of the rail blank work W, the working accuracy of the grooves, and the shapes of the grooves. The longitudinal-direction surface roughness (that is, axis average roughness) of the raceway grooves 2 worked according to the above rolling method can be set in the range of 0.05–0.2 Ra. In case where the groove surface roughness is less than 0.05 Ra, it is difficult to roll the raceway groove 2. On the other hand, in case where the groove surface roughness is more than 0.2 Ra, a problem can be easily arisen in terms of operation and friction.

Figure 14:
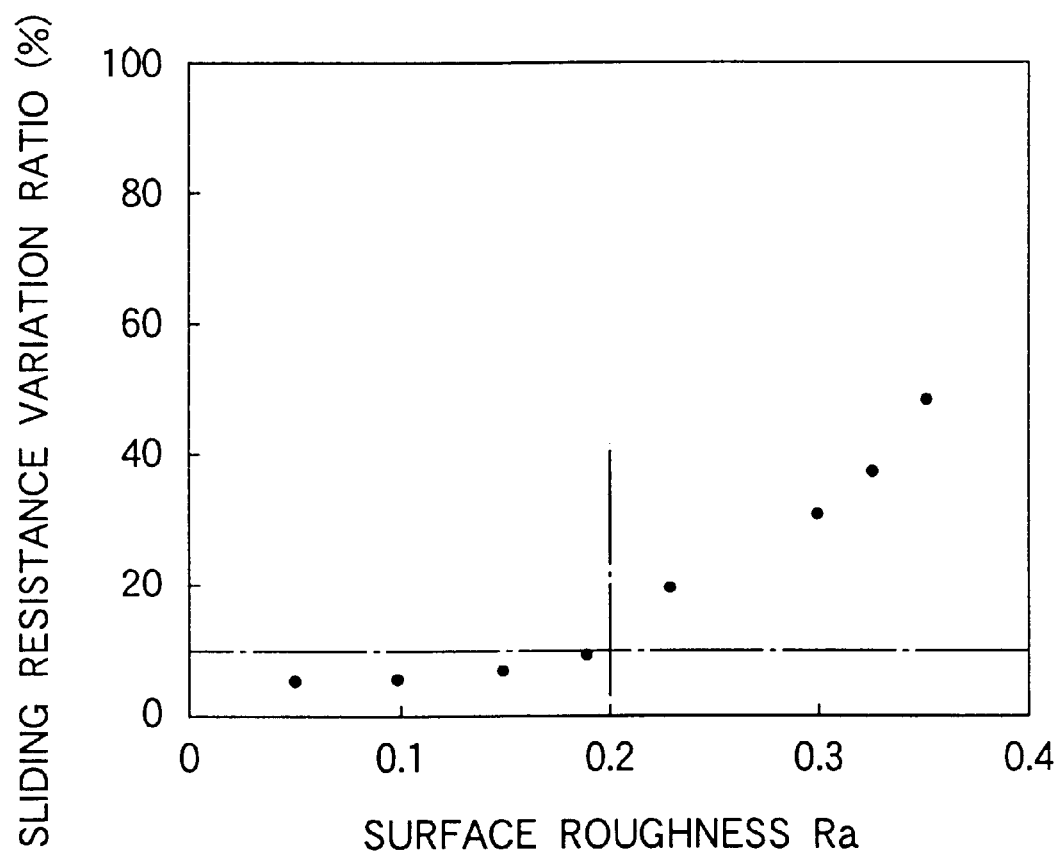
FIG. 14 shows the relation between the surface roughness of raceway grooves formed in a linear guide rail and in a slider, which is assembled into a linear guide rail through rolling bodies such as balls, and the variations of the sliding resistance of the slider; and, FIGS. 15A to 15F show the steps of working a linear guide rail according to a conventional working method.

Now, FIG. 14 shows the relation between the surface roughness of raceway grooves formed in a linear guide rail and in a slider, which is assembled into a linear guide rail through rolling bodies such as balls, and the variations of the sliding resistance of the slider. As can be seen clearly from FIG. 14, in case where the surface roughness Ra exceeds 0.2 μm, the varying ratio (the reducing ratio) of the sliding resistance of the slider increases suddenly.

At any rate, in order to facilitate the working of the raceway grooves 10, the rolling apparatus, preferably, may include an auxiliary drive device which is capable of pressing or drawing the rail blank work W to thereby feed the rail blank work W. Such auxiliary drive device may include a pressing device and/or a drawing device.

Also, the rail blank work W, into which the raceway grooves 10 have been rolled, are then machined or bored to thereby form a mounting bolt bore 5.

Thus, according to the present embodiment, only by a single rolling step, there can be obtained a linear guide rail having raceway grooves 10 which have been rolled with proper accuracy. In the case of a linear guide rail which does not require high accuracy, a linear guide rail worked according to the present embodiment can be applied sufficiently as it is.

In the case of a linear guide rail which requires extremely high accuracy, as the need arises, it is also possible to enforce a grinding operation on a linear guide rail worked according to the present embodiment.

Subsequently, the four planes (that is, the upper surface, two side surfaces, and lower surface of the guide rail) of the rail blank work W as well as the raceway grooves 2 of the rail blank work w are finish worked by grinding into high accuracy. This grinding operation, similarly as shown in FIG. 15F, can be carried out by grinding the raceway grooves on the two sides of the rail blank work W simultaneously.

According to the first embodiment of the invention, when compared with the conventional linear guide rail working method, there can be obtained the following various operations and effects:

(1) Since the raceway grooves 2 are rolled using the rotary dies 10, not only the present method requires a smaller working force than the conventional method which draws a guide rail using a fixed die, but also the rolling apparatus used in enforcing the present method requires smaller rigidity and strength than the apparatus used in the conventional method. Further, due to use of a single apparatus, the present method can be applied more flexibly than the conventional method; and, the installation cost of the apparatus used in the present method is inexpensive when compared with the apparatus used in the conventional method.

(2) Because the guide rail is worked using the rolling contact of the rotary dies 10, the wear of the dies 10 can be reduced, thereby being able to extend the life of a tool used.

(3) As there are obtained, on the rolled surface of the rail blank work W, worked continuous fiber tissues which are characteristic of the rolling, the rail blank work W is increased in strength and the material of the rail blank work W is enhanced in quality.

(4) The rail blank work W after heat treatment produces less strain. This can reduce the grinding allowance of the rail blank work W in a raceway groove grinding step which can be executed after the heat treatment as the need arises. As a result of this, the grinding time of the raceway grooves can be shortened and thus the working cost of the guide rail can be reduced. Also, the warp of the work W caused by the groove grinding operation can be minimized.

(5) Use of the rotational contact of the rotary dies 10 makes it easy to guide lubricant to the working surface of the rail blank work W.

(6) Since the raceway grooves are rolled after the decarburized layer existing on the surface of the rail blank work W is scraped off by an amount of the order of 0.5 mm, there can be obtained sufficient quenched hardness after heat treatment.

By the way, FIG. 1 shows a case in which only the raceway grooves 2 are formed. However, as will be discussed later, in case where a wire holder groove or an oil storage groove is formed in the bottom portion of each of the race grooves 2, by using two projection-shaped dies each including a raceway groove and a wire holder groove or an oil storage groove, the raceway grooves as well as the wire holder groove or oil storage groove can be rolled at the same time. According to such two or more portions simultaneous rolling method, there can be obtained the following advantage: that is, the working operations of a linear guide rail which are conventionally carried out through the separate steps of drawing and cutting can be executed by a single working step.

Now, FIG. 3 shows a second embodiment according to the present embodiment.

In the previously described first embodiment, there is used a rotary die 10 of an active type including a rotation drive device 11 and, on the other hand, the second embodiment is different from the first embodiment in that it uses a rotary die 10A of a passive type which is free to rotate. That is, the rotary die 10A according to the second embodiment is rotated by feeding a rail blank work W which can be pressed in or drawn out in a direction of an arrow mark B by an auxiliary drive device, thereby rolling the raceway grooves 2. In the second embodiment, there is obtained an advantage that a rolling apparatus used is simplified in structure by an amount equivalent to omission of the rotation drive device 11 and thus the manufacturing cost of a product (a guide rail) can be reduced accordingly. And, the remaining portions of the structure as well as the operation and effects of the second embodiment are similar to those of the first embodiment.

Figure 4:
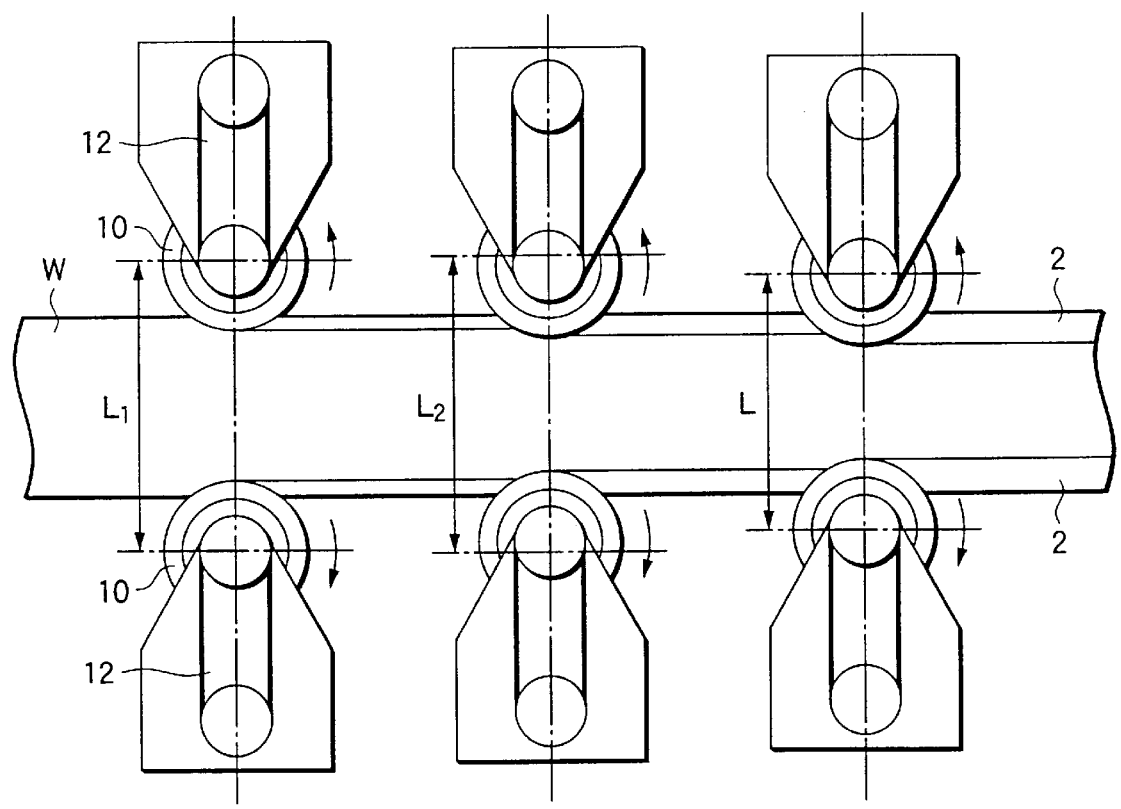
FIG. 4 shows schematically the main portions of a rail raceway groove rolling apparatus according to a third embodiment of the invention.

Now, FIG. 4 shows a third embodiment according to the present embodiment.

In the third embodiment, a pair of rotary dies 10, which are symmetrically opposed to each other with a rail blank work W between them, are used as a set of rotary dies; and, two or more sets of rotary dies (in FIG. 4, three sets of rotary dies) are disposed in series in two or more stages (in FIG. 4, in three stages) along the working and feeding direction of the rail blank work W. While the groove working depth of the work W (that is, the distance between the paired dies 10) increases gradually from $L_1$ in the first stage to $L_2$ in the next stage, the rail blank work W is worked little by little; and, the rail blank work W is worked into a final rolling depth L in the final-stage set. That is, the third embodiment is advantageous in that the raceway groove 2 can be rolled into a final or finished shape by passing the rail blank work W through the rotary dies 10 only once. In this working operation, alternatively, the shapes of the working surfaces of the rotary dies 10 may be changed in every stage and thus the raceway groove 2 may be worked in the optimum shape in the respective stages.

By the way, in FIG. 4, there is used a rotary die of an active type but, of course, it is also possible to use a rotary die of a passive type (see FIG. 3) which does not incorporate therein a rotation drive device (this can also apply similarly in any of the following embodiments of the invention).

And, the remaining portions of the structure as well as the operation and effects of the third embodiment are similar to those of the first embodiment.

Figure 5:
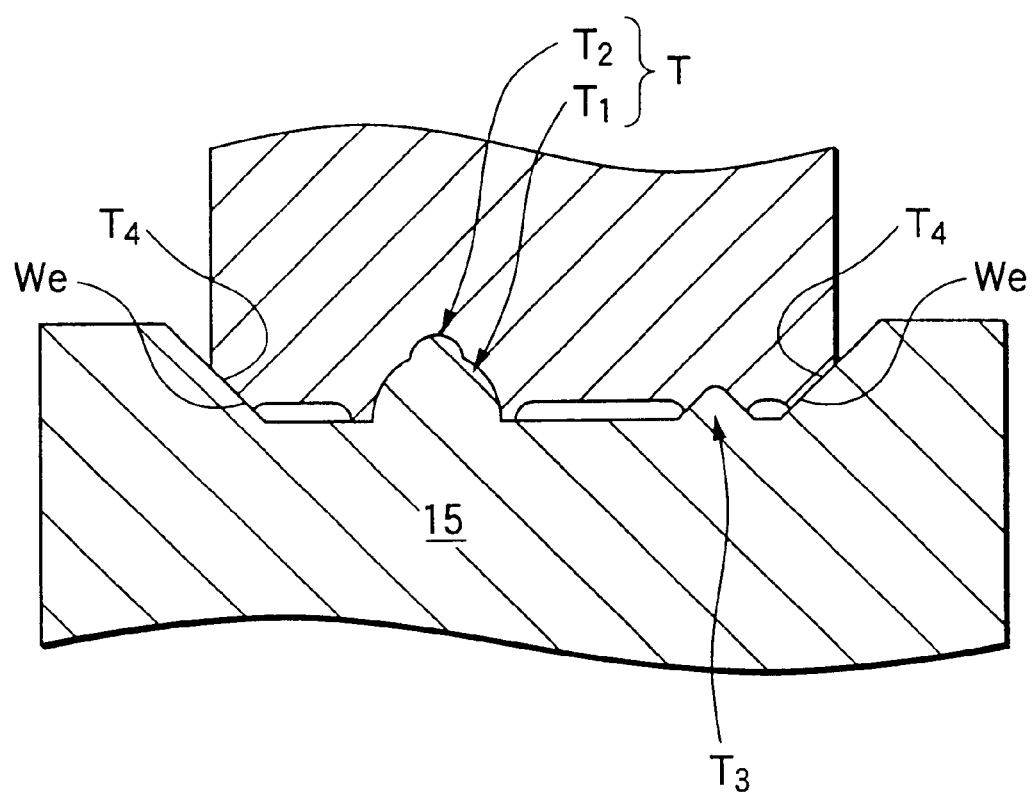
FIG. 5 is an enlarged section view of the main portions of a rotary die for simultaneously working a plurality of portions according to a fourth embodiment of the invention.

Now, FIG. 5 shows a fourth embodiment according to the invention.

FIG. 5 is an enlarged view of the outer peripheral surface (groove working surface) which is the working portion of a rotary die 15. The projection-shaped working portion of the rotary die 15 is formed in a two-stage shape which is composed of a raceway groove projecting portion $T_1$ and an oil storage projecting portion $T_2$ so as to correspond to the groove shape of the raceway groove 2 of a linear guide rail to be rolled. Also, in addition to the projection-shaped working portion having two-stage shape composed of the raceway groove projecting portion $T_1$ and oil storage projecting portion $T_2$, the rotary die 15 includes a base surface display line projecting portion $T_3$ for working a base surface display line 4 and a chamfer working portion $T_4$ for chamfering the corner portion We of a rail blank work W.

By using the rotary die 15 including the plurality of working portions, in addition to the operation and effects obtained in the first embodiment, there can be obtained another effect that working can be achieved with extremely high efficiency: that is, rolling of the linear guide rail raceway groove 2, working of an oil storage or wire holder groove 3 to be formed in the bottom portion of the raceway groove 2, working of the base surface display line 4 and chamfer working of the rail corner portion We can be carried out at the same time in a single step. of course, in case where the oil storage projecting portion $T_2$ of the working portion of the rotary die 15, the base surface display line projecting portion $T_3$ thereof and the corner portion chamfer working portion $T_4$ thereof are selected properly, as the need arises, any one of the oil storage groove 3, reference surface display line 4 and corner portion chamfer working portion We can also be selectively worked simultaneously when the raceway grooves 2 are worked.

Figure 6A:
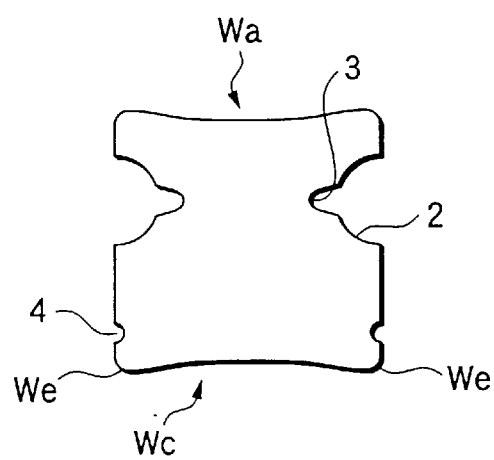
FIGS. 6A to 6D are front views of a linear guide rail having a dented mounting surface worked according to the invention; in particular.
Figure 6B:
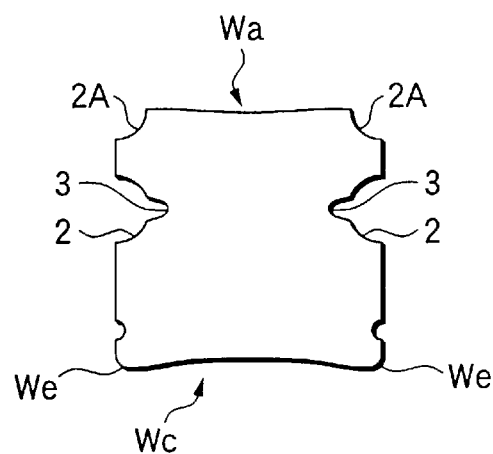

Also, by rolling the linear guide rail raceway grooves 2 using the rotary dies 10 which are paired with each other with the linear guide rail between them as shown in FIGS. 1 to 4, or by rolling the rail blank work Using the rotary die 15 including such two chamfer working portions $T_4$ as shown in FIG. 5, there can be obtained the following advantage: that is, as shown in FIGS. 6A and 6B, the rail blank work W has such a cross section that the width-direction two end portions of the rail surface (which provide a mounting surface for mounting the rail onto a base member) We are raised and the width-direction central portion thereof is dented, thereby being able to enhance the mounting safety of the thus finished guide rail.

Figure 6C:
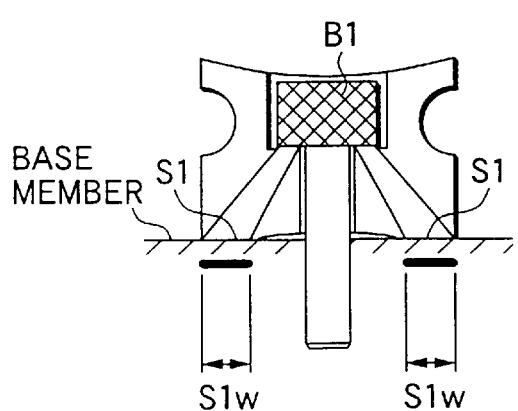
Figure 6D:
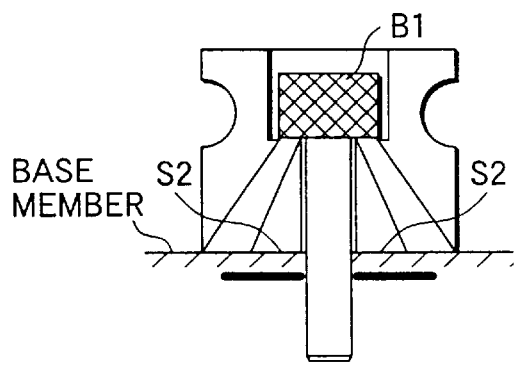

Specifically, FIG. 6A shows the cross section of a single groove type which includes a pair of right and left raceway grooves 2 each having an oil storage or wire holder groove 3, and a base surface display line 4 for the left side surface of a guide rail to be rolled. And, FIG. 6B shows the cross section of a two-groove type which includes not only a pair of right and left raceway grooves 2 each having an oil storage or wire holder groove 3 and a base surface display line 4 for the left side surface of the guide rail to be rolled but also a pair of right and left ¼ arc-shaped raceway grooves 2A formed on the right and left corner portions of the upper surface of the guide rail. In this case, the linear guide rail is rolled using the rotary die 15 structured such that one (upper surface side) of the two chamfer working portions $T_4$ is formed so as to have a ¼arc-shaped projecting shape. Also, FIG. 6C shows a stress state in which a linear guide rail having a dented rail mounting surface Wc is fixed on the base member by fastening a bolt B1. In this case, contact surfaces S1 between the base member and rail surface Wc are only the two width-direction end portions of the linear guide rail excluding the central portion thereof. The sum of the widths $S1_w$ of two contact surfaces S1 is in the range of approx. 10% to 50% of the whole width of the rail mounting surface Wc. That is, when compared with contact surfaces S2 provided by a conventional linear guide rail whose rail mounting surface is formed flat shown in FIG. 6D, the present contact surfaces S1 spread out outwardly in the width direction of the linear guide rail and, therefore, the linear guide rail can stand firm against lateral loads applied thereto, which can enhance the mounting strength of the linear guide rail.

By the way, when using such rotary die 15 having two chamfer working portions $T_4$ as shown in FIG. 5, in case where the corner portions We of the rail blank work W prior to rolling are previously cut by an amount equivalent to the portions thereof that would be raised when they are rolled, there can be provided a linear guide rail whose rail lower surface (mounting surface) Wc is flat.

Figure 7:
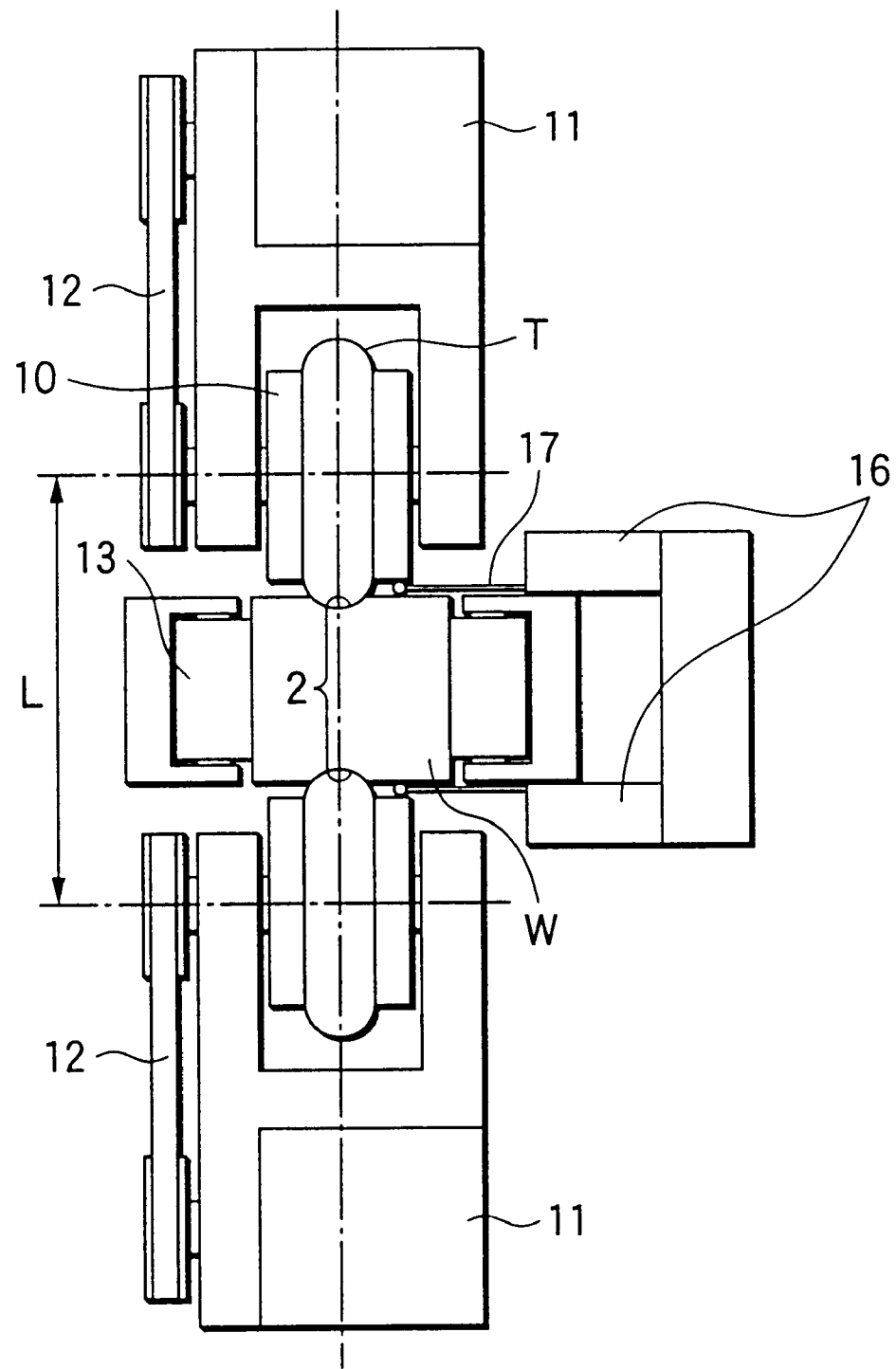
FIG. 7 is a front view of a rail raceway groove rolling apparatus according to a fifth embodiment of the invention.

Now, FIG. 7 shows a fifth embodiment according to the invention.

In the fifth embodiment, while the distance L between the two rotary dies is being kept constant due to automatic control, the raceway groove 2 of the linear guide rail is rolled using the rotary dies 10. Specifically, the present embodiment includes an inter-die distance (that is, a distance between the rotary dies 10) measuring machine 16: the inter-die distance L in the vicinity of the working portion of the raceway groove 2 is detected by a sensor 17 and is fed back to a control unit (not shown), the thus detected and fed-back inter-die distance L is compared with an inter-die distance set value which has been previously input into the control unit, a difference compensation instruction is transmitted to a moving and pressing mechanism (not shown) to thereby control the positions of the two rotary dies 10, 10 in such a manner that the inter-die distance L can be kept constant; that is, the raceway groove 2 of the linear guide rail are rolled using these rotary dies 10 in this manner. Therefore, according to the present embodiment, there is obtained an advantage that a linear guide rail with the inter-raceway groove distance thereof stabilized can be manufactured.

And, the remaining portions of the structure as well as the operation and effects of the fifth embodiment are similar to those of the first embodiment.

Figure 8:
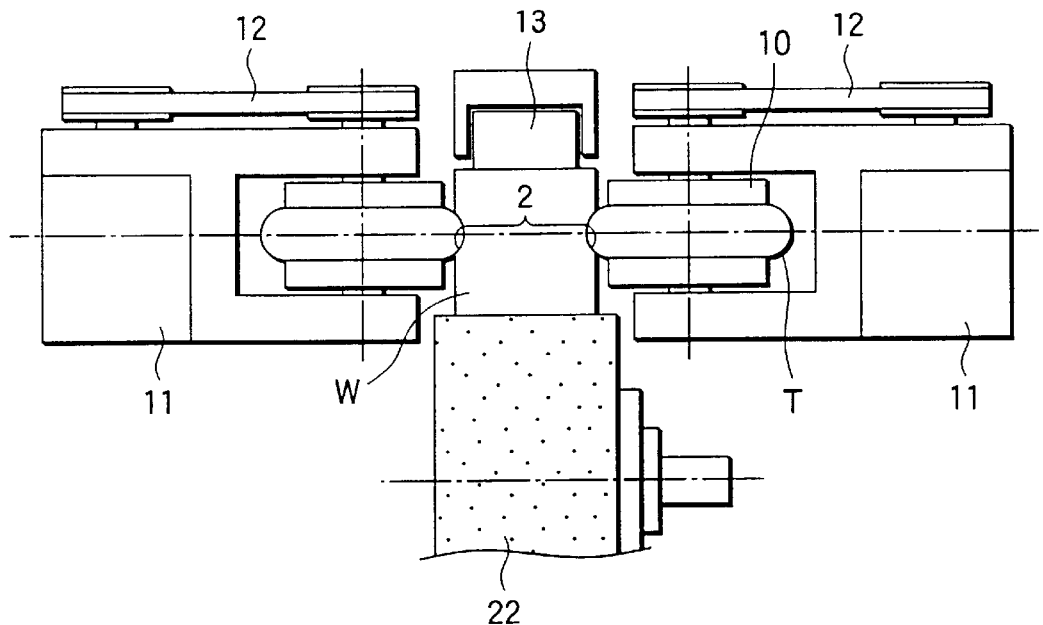
FIG. 8 is a front view of a rail raceway groove rolling apparatus according to a sixth embodiment of the invention.

Now, FIG. 8 shows a sixth embodiment according to the invention.

In the present embodiment, at the same time when two raceway grooves 2, 2 are rolled respectively onto the two side surfaces of a linear guide rail using a pair of rotary dies 10, 10, the lower surface of the linear guide rail is ground (or cut) using a grinding tool (or a cutting tool) 22 while the grinding tool (or cutting tool) 22 is being pressed against the rail lower surface. Thanks to this, when the two raceway grooves 2, 2 of the two side rails of the linear guide rail are rolled using the pair of rotary dies 10, 10, the raised portions (see FIG. 6) produced in the width-direction two end portions of the lower surface (which provides a rail mounting surface onto a base member) Wc of the linear guide rail can be removed to thereby form the rail mounting surface Wc into a flat surface. This can enhance the longitudinal-direction parallelism of the rail raceway grooves 2, 2 with respect to the lower surface of the linear guide rail without increasing the number of steps of working the rail raceway grooves. In the above description of FIG. 6, as the advantage of the raised portions produced by the rolling of the rail raceway grooves 2, 2, there was pointed out a fact that a linear guide rail including a mounting surface having a dented width-direction central portion can be enhanced in stability when it is mounted onto its base member and the strength of such linear guide rail can be thereby increased. On the other hand, the raised portions provide an indefinite factor to the relative dimension between the rail raceway grooves 2, 2 and the rail mounting surface. In view of this, in the use that requires high dimensional accuracy between the rail raceway grooves 2, 2 and rail mounting surface, it is preferred that the rail mounting surface may be ground (or cut) into a flat shape at the same time when the rail raceway grooves 2, 2 are rolled.

For reference, to secure the parallelism of the rail raceway grooves simply through rolling, it is necessary that the guide rollers of a positioning and supporting device 13 respectively disposed on the upper and lower surfaces of the linear guide rail are pressed against the linear guide rail to thereby crash the raised portions of the rail. In fact, however, it is almost impossible to roll the four surfaces of the linear guide rail at the same time, because the guide rollers interfere with each other.

Figure 9:
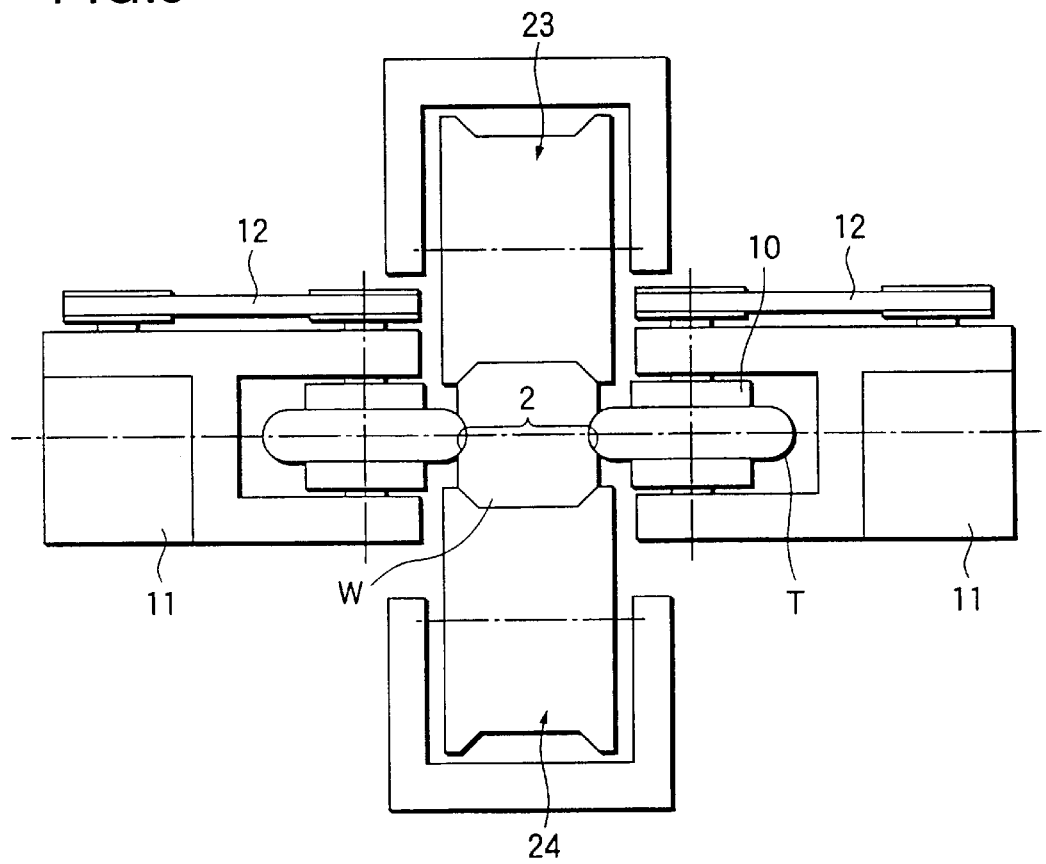
FIG. 9 is a front view of a rail raceway groove rolling apparatus according to a seventh embodiment of the invention.

Now, FIG. 9 shows a seventh embodiment according to the invention.

In the present embodiment, at the same time when two raceway grooves 2, 2 are rolled respectively onto the two side surfaces of a linear guide rail using a pair of rotary dies 10, 10., the upper and lower surfaces of the linear guide rail are ground (or cut) using grinding tools (or cutting tools) 23, 24 while the grinding tool (or cutting tool) 23, 24 are being pressed against the rail upper and lower surfaces respectively. That is, in the present embodiment, the two raceway grooves 2, 2 of the two side surfaces of the linear guide rail can be rolled using the pair of rotary dies 10, 10. Simultaneously with such rolling of the raceway grooves 2, 2, not only, using the grinding tool 23, the raised portions (see FIG. 6) produced in the width-direction two end portions of the upper surface Wa of the linear guide rail are removed and the rail upper surface Wa is formed into a flat surface while chamfering the width-direction two end portions of the upper surface Wa, but also, using the grinding tool 24, the raised portions (see FIG. 6) produced in the width-direction two end portions of the lower surface (which provides a rail mounting surface onto a base member) Wc of the linear guide rail are removed and the rail lower surface Wc is formed into a flat surface while chamfering the width-direction two end portions of the rail lower surface Wc.

Thus, according to the seventh embodiment, the parallelism of the rail raceway grooves 2, 2 in the longitudinal direction thereof with respect to the lower surface of the linear guide rail can be enhanced without increasing the number of steps of working the rail raceway grooves 2, 2.

Figure 10:
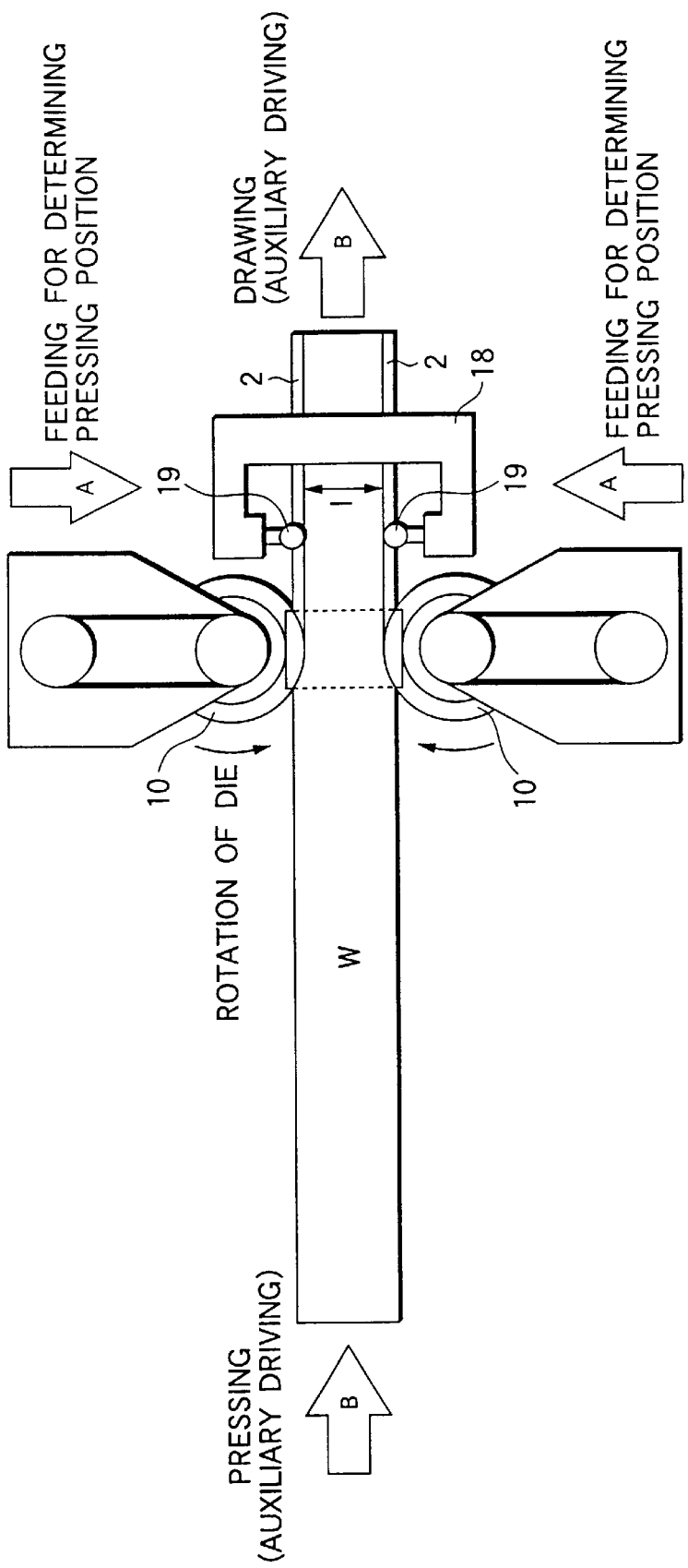
FIG. 10 is a front view of a rail raceway groove rolling apparatus according to an eighth embodiment of the invention.

Now, FIG. 10 shows an eighth embodiment according to the invention.

The eighth embodiment is a modified version of the fifth embodiment shown in FIG. 7. The eighth embodiment includes an inter-groove distance (that is, a distance between two raceway grooves) measuring machine 18 instead of the above-mentioned inter-die distance (that is, a distance between two rotary dies) measuring machine 16: that is, a distance 1 between the two raceway grooves 2, 2 just after they are rolled using the two rotary dies 10, 10 is measured by bringing a sensor 19 into direct contact with the bottom portions of the raceway grooves 2. In accordance with the measured result, the positions of the rotary dies 10, 10 are fed back and controlled by a moving and pressing mechanism (not shown) in such a manner that the inter-groove distance 1 can provide a desired distance. Thanks to this, according to the present embodiment, similarly to the previously described fifth embodiment, it is possible to roll a linear guide rail in which the inter-groove distance 1 is stabilized.

And, the remaining portions of the structure as well as the operation and effects of the eighth embodiment are similar to those of the first embodiment.

Figure 11:
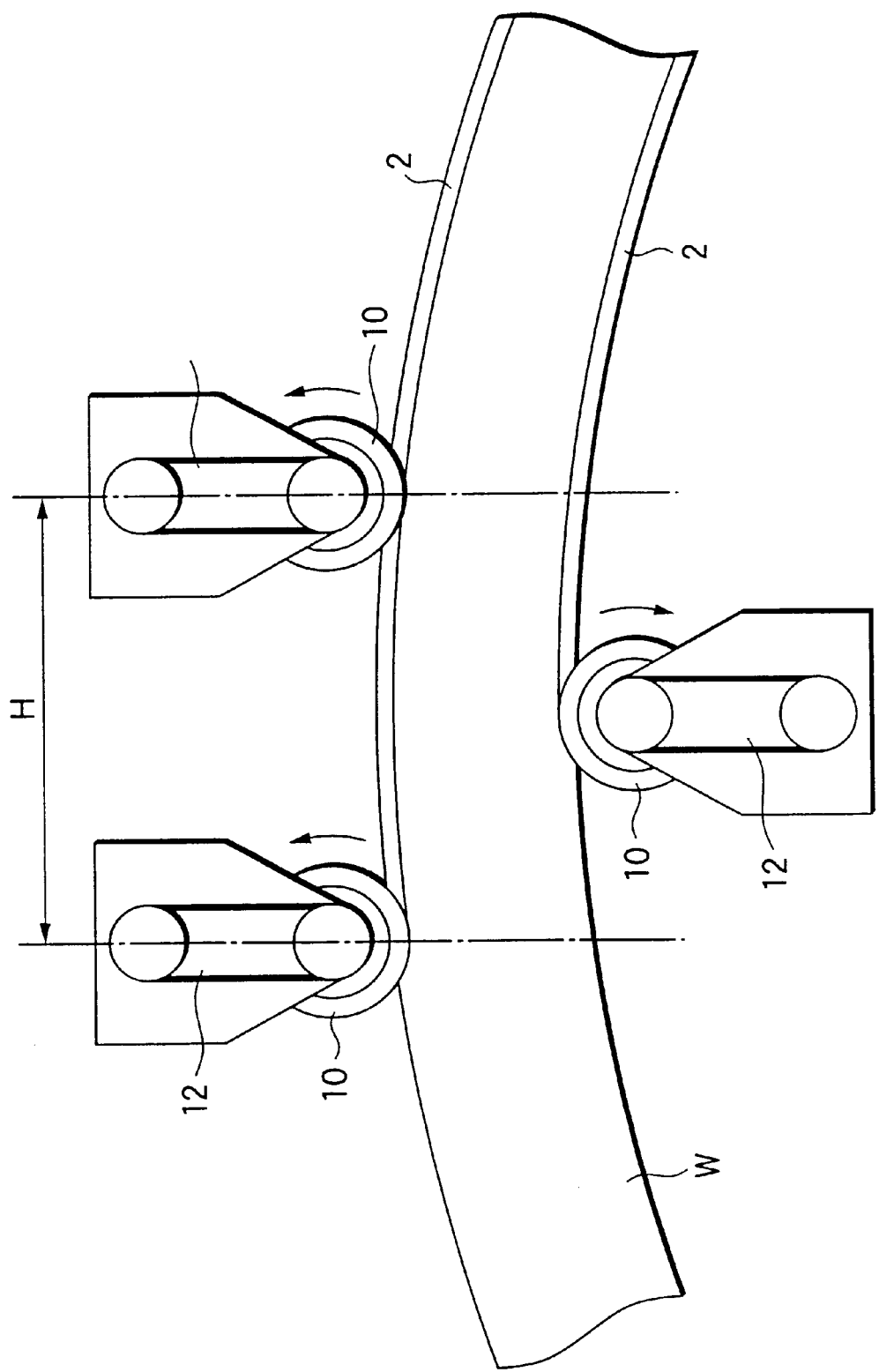
FIG. 11 is a front view of a rail raceway groove rolling apparatus according to a ninth embodiment of the invention.

Now, FIG. 11 shows a ninth embodiment according to the invention.

In all of the previously described embodiments, the axis of a linear guide rail is linear. On the other hand, according to the present embodiment, there is provided a method for working a curved rail.

In the present embodiment, three rolling rotary dies 10 are used as a set: specifically, two of them are disposed on one side of a rail blank work W, whereas the remaining one is disposed at the middle position of the two dies on the other side of the rail blank work W. That is, raceway grooves 2, 2 are respectively rolled on the two sides of the rail blank work W using a set of (three) rotary dies, whereby a linear guide rail having a curvature can be worked simultaneously when the raceway grooves 2 are rolled. The curvature of the guide rail W can be adjusted by adjusting a die pressing force as well as a rail-axis direction distance H between the two rotary dies 10.

Figure 12:
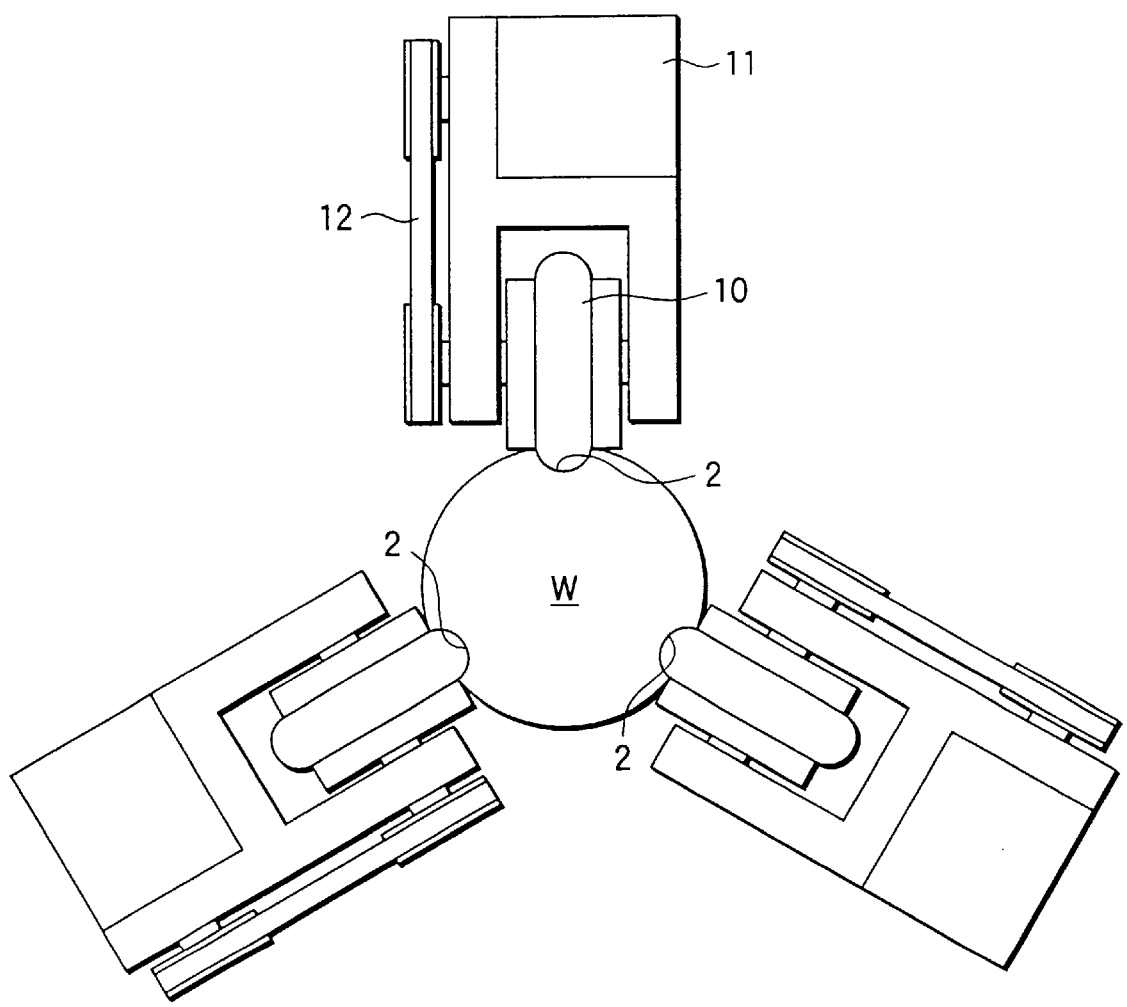
FIG. 12 is a front view of a rail raceway groove rolling apparatus according to a tenth embodiment of the invention.

Now, FIG. 12 shows a tenth embodiment according to the invention.

In the present embodiment, using three rotary dies 10, raceway grooves (spline grooves) 2 are rolled in the three equal peripheral portions of a rail blank work W having a circular section of a ball spline shaft which is one kind of a linear guide rail. In the illustrated embodiment, three rotary dies 10 each of an active type to be driven or rotated by a motor 11 through a belt 12 are disposed at equally spaced positions along the periphery of the rail blank work W, and the raceway grooves 2 are rolled on the rail blank work W using these three rotary dies 10. However, the number of rotary dies is not always limited to three.

And, the remaining portions of the structure as well as the operation and effects of the tenth embodiment are similar to those of the first embodiment.

Figure 13B:
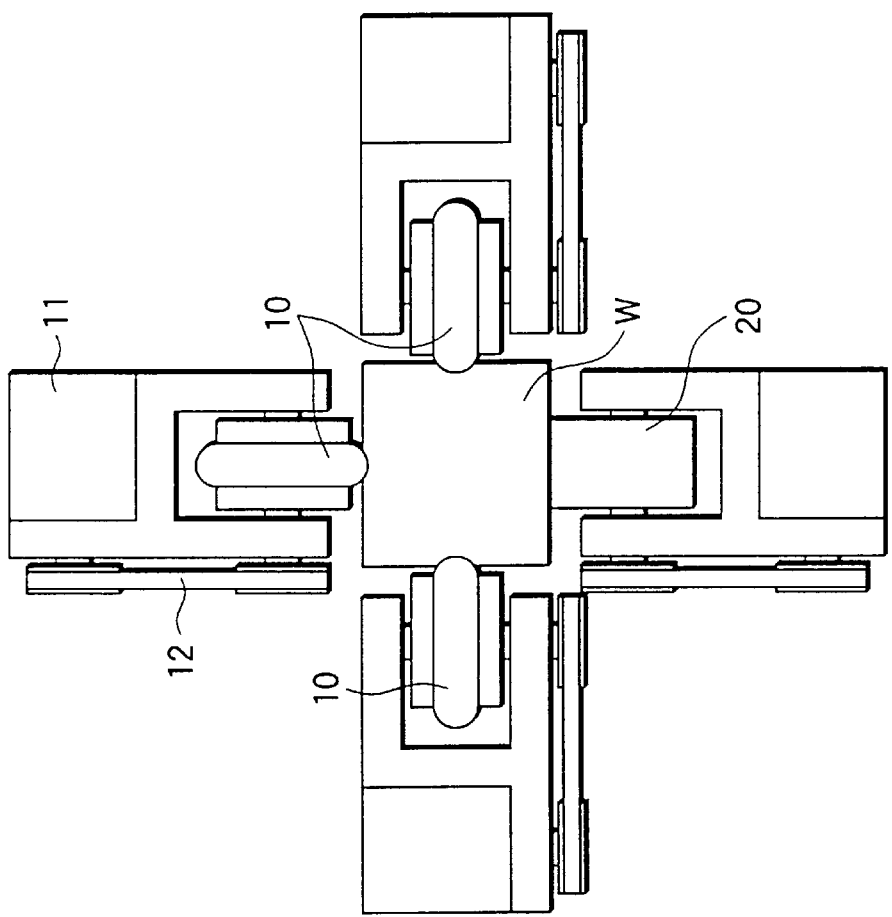
FIGS. 13A and 13B are a front view of a rail raceway groove rolling apparatus according to an eleventh embodiment of the invention; in particular.
Figure 13A:
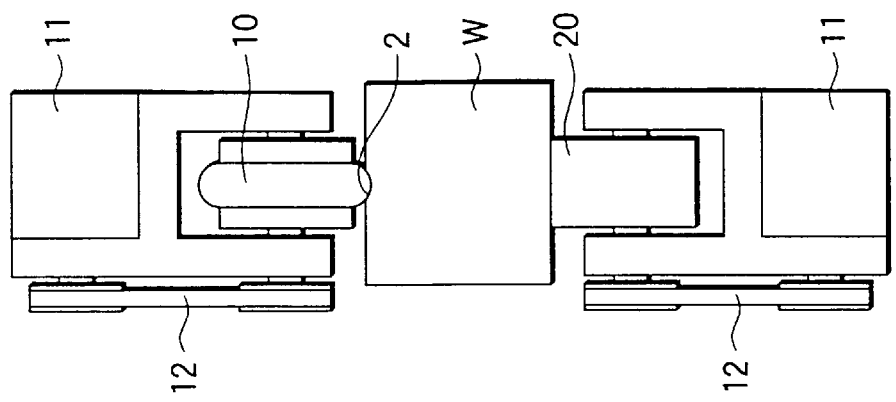

Now, FIGS. 13A and 13B show an eleventh embodiment according to the invention.

In the present embodiment, raceway grooves are rolled on an odd number of surfaces of a rail blank work W having a square section of a cross roller guide which is a kind of, for example, a circular-type linear guide rail.

Specifically, FIG. 13A shows a case in which a raceway groove 2 is worked on the only one surface of the rail blank work W; and, in this case, there is disposed a groove working rotary die 10 and, on the opposing side of the groove working rotary die 10, there is disposed a load receiving rotary die 20. In the load receiving rotary die 20, the circumferential surface thereof is not formed in such a projecting shape as in the groove working rotary die 10 but is formed simply cylindrical: that is, the load receiving rotary die 20 may only be able to receive the load of the groove working rotary die 10 which is disposed on the opposing side of the load receiving rotary die 20, while the load receiving rotary die 20 can be driven or rotated by a motor 11 through a belt 12.

Also, FIG. 13B shows a case in which raceway grooves 2 are rolled on the three surfaces of the rail blank work W. In this case, perpendicularly to the above-mentioned groove working rotary die 10 for rolling a raceway groove onto one surface of the rail blank work W, there are further disposed a pair of groove working rotary dies 10, 10 in such a manner that these two rotary dies 10, 10 are opposed to each other with the remaining surfaces of the rail blank work W between them; and, the raceway grooves 2 are respectively rolled on the three surfaces of the rail blank work W.

Thus, according to the raceway groove working method shown in FIGS. 13A and 13B, there is obtained an advantage that a linear guide rail having raceway grooves on an odd number of surfaces of the rail blank work W or having an odd number of raceway grooves thereon can be rolled accurately and easily.

And, the remaining portions of the structure as well as the operation and effects of the eleventh embodiment are similar to those of the first embodiment.

While only certain embodiments of the invention have been specifically described herein, it will apparent that numerous modifications may be made thereto without departing from the spirit and scope of the invention.

As has been described heretofore, according to the invention, since a rolling technique is applied to working of one or more raceway grooves of a linear guide rail to thereby form raceway grooves having good accuracy only by a single working step, when compared with a conventional method requiring a plurality of steps of drawing, cutting and grinding a linear guide rail, the working time and cost of the raceway grooves and thus the linear guide rail can be reduced.

Also, even in case where the thus worked raceway grooves are ground in order to secure extremely high accuracy as the need arises, the grinding allowance can be minimized, which makes it possible to shorten the grinding time of the linear guide rail, reduce the working cost thereof, and enhance the working accuracy thereof.

What is claimed is:

1. A linear guide rail, comprising:

at least one raceway groove along which rolling bodies roll, said raceway groove being subjected to rolling work, wherein the surface roughness of said raceway groove in the longitudinal direction thereof is in the range of 0.05–0.2 Ra.

2. The linear guide rail according to claim 1, further comprising:

a lower surface formed in such a dented shape that the width-direction two end portions thereof are projected slightly up from the width-direction central portion thereof.

3. The linear guide rail according to claim 1, wherein a surface of said linear guide rail to be rolled is subjected to removal of a decarburized layer.

* * * * *